No. 713,058. Patented Nov. 11, 1902.
R. D. CAMP.
ROLLER BEARING.
(Application filed July 27, 1900.)
(No Model.)
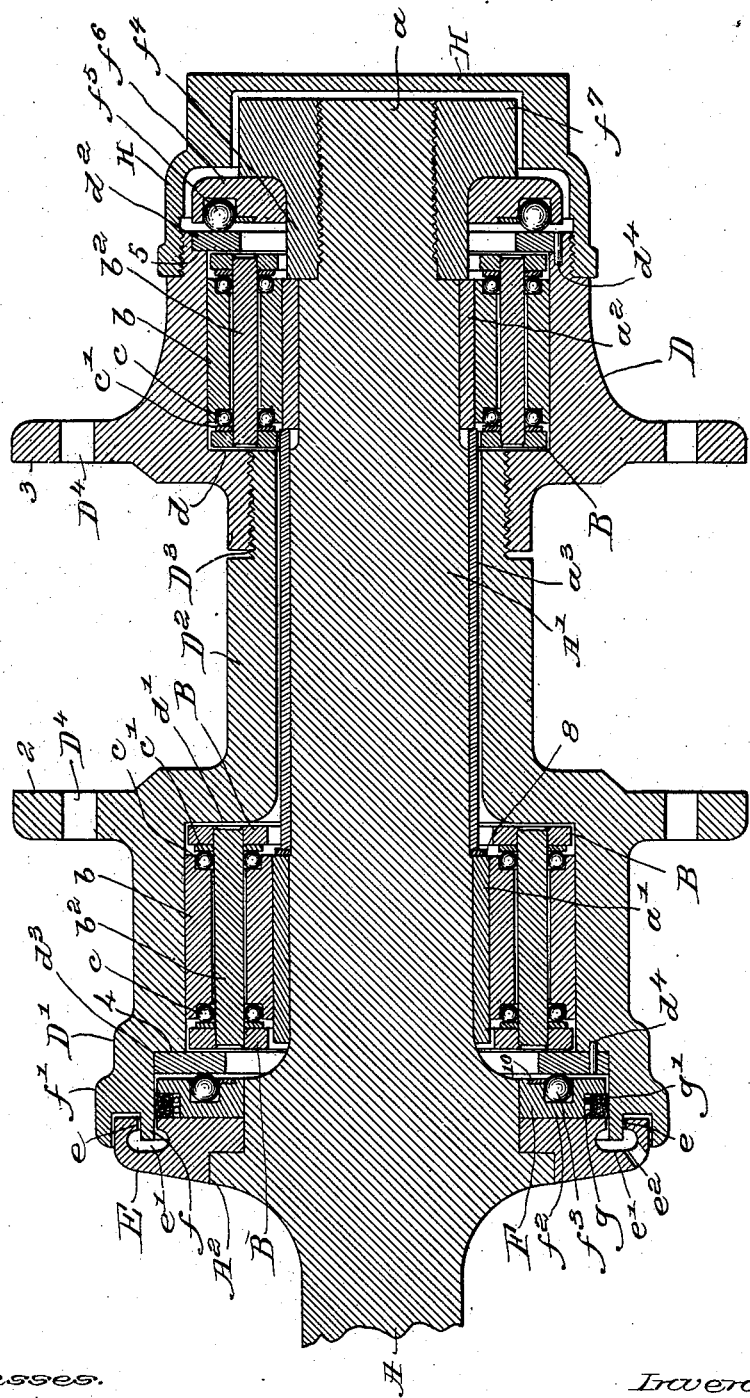

UNITED STATES PATENT OFFICE.

ROBERT D. CAMP, OF CHICAGO, ILLINOIS, ASSIGNOR TO MOFFETT BEARING COMPANY, OF COUNCIL BLUFFS, IOWA.

ROLLER-BEARING.

SPECIFICATION forming part of Letters Patent No. 713,058, dated November 11, 1902.

Application filed July 27, 1900. Serial No. 24,971. (No model.)

*To all whom it may concern:*

Be it known that I, ROBERT D. CAMP, a citizen of the United States, residing at Chicago, county of Cook, State of Illinois, have invented an Improvement in Roller-Bearings, of which the following description, in connection with the accompanying drawings, is a specification, like characters on the drawings representing like parts.

My invention in roller-bearings is herein represented as embodied in connection with a stationary journal and a rotatable box.

My invention relates more particularly to a construction of journal and nut whereby the journal surrounded by a cage containing a roller-bearing may be materially shortened and the bearing be consequently made more compact. I have further provided the collar with a waterway whereby water falling upon the hub and collar may traverse the waterway and be discharged at the under side of the collar and axle. The neck of the nut is encircled by a chambered and hardened end-thrust plate having a raceway for the reception of balls to overcome end thrust. The rear end-thrust plate besides having a raceway for balls is surrounded by a packing, which constitutes a dust-guard, and a suitable spring acting expansively within the packing forces the packing outwardly against the interior of the box and prevents dust from entering the box to contact with the bearing-rollers and the surface of the journal over which said rollers travel. The arm or journal of the shaft has applied to it steel tracks made as sleeves, over which the bearing-rollers of the traveling cage may roll, said tracks being separated, as herein shown, by spacing device, represented as a tube.

The drawing illustrates my invention in one of the best forms now known to me.

Referring to the drawing, A represents an axle having an arm or journal A', provided with a collar A², represented as forged integral with the axle, said journal being provided at its outer end with a screw-threaded portion or tenon $a$. The arm or journal has applied to it two hardened-steel tracks $a'$ $a^2$, separated by a spacing device, shown as tube $a^3$. The tracks $a'$ $a^2$ sustain a series of bearing-rollers $b$, contained in traveling cages B, I having illustrated two such cages, each composed of end walls united rigidly by suitable bars, as provided for in United States Patent No. 664,820, dated December 25, 1900, said cages containing at intervals suitable or usual roller-supports $b^2$, herein represented as spindles having their ends held in the cage ends, so that the spindles cannot rotate. The ends of the rollers $b$ are herein represented as chambered to receive balls $c$, which contact with the chambered portions of said rollers and also with the spindles $b^2$. For ease of manufacture the cage may be made of soft steel, and to furnish a hard track or raceway against which the balls may run in the planetary motion of the rollers I may interpose at the inner sides of the cage ends and surrounding the spindles suitable steel washers $c'$.

The box herein shown as surrounding the journal and constituting part of the hub of the wheel is composed of two parts D D', suitably chambered to receive the cages B. The part D' has a sleeve D², suitably threaded to be engaged by a screw-threaded portion D³ of the part D, the sleeve D² being screwed into the threaded portion D³ and causing the inner faces 2 and 3 of said portions to retain in usual manner the spokes used in the wheel, the parts D and D' being united firmly by suitable bolts (not shown) extended through the alined holes D⁴. The shoulder $d$ of the part D and the shoulder $d'$ of the part D' constitute each a cage-controller to coact with the inner ends of the cages B B as they slide longitudinally on the arm or journal; the opposite ends of the cage coacting with cage-controllers composed of rings $d^2$ $d^3$, inserted, respectively, in the open ends of the parts D and D' and against suitable shoulders 4 and 5 therein. Preferably the rings $d^2$ and $d^3$ will be restrained from rotation in the box by means of suitable fastenings, which may be dowel-pins $d^4$. The distance between the adjacent faces of the cage-controllers is in excess of the length of the traveling cages B, so that the ends of said cages as they rotate in the direction of rotation of the box contact only at intervals with one or the other controller, according to variations in the road-bed on which the wheel containing the box is traveling, the ends of the cage as the latter slides longitudinally of the axis of the journal being struck by one or the other controller moving with the box at a speed faster than that of the cage and returned into its substantially free running position between said controllers, as provided for in said patent.

The traveling cages carrying the bearing-rollers are both alike, and each cage has like steel washers $c'$, against which run the series of balls $c$, entering chambers in the end of the bearing-rollers $b$, said balls also contacting with the spindles $b^2$.

The collar E, carried by the axle and having an annular groove $e$, prevents water entering the box. The groove $e$ is enlarged at its inner end, as at $e'$, to constitute a waterway, said waterway at the lower side of the plate being provided with an outlet $e^2$. A projection $f$ from the inner end of the part D' of the box enters the groove $e$, while the projection $f'$ from the part D' of the box overlaps the periphery of the collar E. Water coming upon the box D' or collar E and entering the space between the projection $f'$ of the box and the collar E will be interrupted by the projection $f$, which is annular in shape, and the water will be diverted by centrifugal action from the end of said projection and into the waterway $e'$. A part of the collar $A^2$ inside the collar E is herein represented as surrounded by a chambered and hardened end-thrust plate F, having at its inner face an annular groove $f^2$, which receives a series of balls $f^3$, retained therein in suitable manner, as by an annular washer 10, the balls in said groove running against the ring $d^3$ and resisting the end thrust of the inner end of the box. To resist the end thrust at the outer end of the box, I have provided the nut $f^7$ with a hardened-steel end-thrust plate $f^6$, that sustains suitable antifriction means, as balls $f^5$, said end-thrust plate surrounding the inwardly-extended flange $f^4$ of a nut $f^7$, having an internal screw-thread to engage the threaded projection $a$ of the journal. The balls $f^5$ are interposed between said end-thrust plate $f^6$ and the outer face of the ring $d^2$, located at the outer end of the portion D of the box.

The end-thrust plate F has an annular groove in its circumference, in which is placed a spring $g$, a packing $g'$ being thereafter inserted to fill the groove and surround and compress said spring. The spring $g$ is of such size and such construction that when the packing is applied in the groove outside of the spring the spring is somewhat compressed, which gives to it a tendency to expand, which causes the outer face of the packing to contact firmly with the interior of the box and also with the side walls of the groove in which the packing is contained, said packing acting to prevent the entrance of dust into the box to interfere with the running of the bearing-rollers about the journals. The nut $f^7$, which may be of cast metal, has a tubular sleeve $f^4$ long enough to extend through the ring $d^2$ at the end of the part D of the box and to enter the space at the center of the right-hand end wall of the traveling cage B nearest the end of the journal, said nut inside said cage abutting, preferably, the outer end of the annular track $a^2$ and retaining it against longitudinal movement, said cage in its sliding movement passing over and about the portion $f^4$ of the nut. Usually the nut applied to a journal to retain a box thereon for good construction has its threaded surface uniting the nut and journal equal in length to the diameter of the threaded part at the end of the journal and upon which the nut is screwed; but it will be seen that by providing the nut with the extended portion $f^4$ of a length sufficient to enter the box the length of the journal from the collar $A^2$ to the end of the threaded portion $a$ may be lessened by a distance equal to the length that the sleeve $f^4$ extends from the inner side of the plate $f^6$, and any reduction of the length of the journal without sacrificing its strength is of material moment not only in saving of stock, but also in reducing the width of the vehicle.

To further provide for excluding dust from the bearing the nut $f^7$ and the outer end of the journal are incased dust-tight by a cap H, threaded at its inner end to embrace a threaded portion at the outer end of the part D of the box.

The invention herein described is not limited to making the two parts of the box exactly as represented in the drawing.

In practice the journal A' tapers and is made smaller in portions toward the nut-receiving end, and to provide for maintaining the sleeves or tracks $a'$ $a^2$ at different levels and insure that the ends of the sleeve $a^3$ properly coact with the sleeves or tracks $a'$ $a^2$ I provide a washer 8, which may be of steel, it being met by one end of the tube $a^3$, the interposition of the washer between the track and sleeve enabling the tracks and tube $a^3$ to coact, although of different diameters.

Having described my invention, what I claim as new, and desire to secure by Letters Patent, is—

1. In a bearing, a box, an open ring at its outer end, a journal having a threaded nut-receiving end extended beyond the outer end of said box, a nut screwed upon the threaded end of said journal and an end-thrust plate, said nut entering the central opening of said ring and retaining the hub on the journal, and antifriction means interposed between the said ring and end-thrust plate.

2. In a bearing, a box having near its outer end a shoulder, an open-centered detachable ring, a journal having a threaded end extended beyond the outer end of said box, a traveling cage surrounding said journal, and bearing-rollers, said cage and rollers rotating between said box and journal, an end-thrust plate and a nut screwed upon the outer end of said journal, said nut having at its inner side a tubular extension to pass through the open center of said ring and enter said cage, the end-thrust plate of said nut retaining said hub on said journal.

3. In a bearing, a box, a detachable ring at its end, a journal surrounded by said box, a traveling cage and bearing-rollers, a nut attached to said journal and carrying an end-thrust plate, and a series of balls interposed between said end-thrust plate and said ring, the inner side of said ring constituting a controller for one end of said traveling cage.

4. In a bearing, a box, a detachable ring at its end, a journal surrounded by said box and threaded at its end to receive a nut, a nut secured thereon, an end-thrust plate surrounding said nut, and antifriction devices interposed between said ring and end-thrust plate, said nut being extended through said ring and entering said box.

5. In a bearing, a journal having a collar, an annularly-grooved end-thrust plate surrounding said journal at the inner side of said collar, a box, a detachable ring in the end of said box next said end-thrust plate, and a series of balls interposed between said ring and end-thrust plate and guided by said groove.

6. In a bearing, a journal having a collar, and provided at its outer end with a threaded tenon, a box surrounding said journal and a ring at each end of the box, a nut applied to said tenon, an end-thrust plate surrounding the journal at the inner side of said collar, and series of balls interposed between the outer faces of the rings at the outer ends of said box, and the faces of said end-thrust plates contiguous to said rings to operate substantially as described.

7. In a bearing, a journal having a collar provided at its inner face with an annular groove having an enlarged waterway, said waterway having an outlet at the under side of the collar.

8. In a bearing, a journal having a collar provided at its inner face with an annular groove having a connected and enlarged waterway provided with an outlet for water, combined with a box having at its end a flange to enter said annular groove.

9. In a bearing, a journal having a collar provided at its inner face with an annular groove having a connected and enlarged waterway provided with an outlet for water, combined with a box having at its end a projection to enter said annular groove, and also a flange overlapping the periphery of said collar.

10. In a roller-bearing, a journal, a surrounding box separable between its ends, a stationary and a removable cage-controller at opposite sides the transverse center of said box, and a traveling cage in each part of said box, bearing-rollers for said cages, and means carried by said journal and acting against said removable cage-controllers to retain said box on said journal.

11. In a roller-bearing, a journal, a collar provided with an annular groove cut in one side thereof, said groove being enlarged at its inner end to constitute a waterway, an end-thrust plate located at the grooved side of said collar and containing a series of balls, a packing surrounding said end-thrust plate externally, combined with a box, a ring $d^3$ in the end of the box to contact with the balls referred to, said box having two flanges one entering the annular groove referred to, and the other encircling the end-thrust plate as and for the purpose set forth.

12. A metallic box composed of two parts, each part having an external flange and two internal shoulders, said parts being provided with screw-threads to determine the distance of said external flanges one from the other, a plurality of traveling cages having bearing-rollers, the internal shoulders of the box nearest said external flanges acting as cage-controllers for the inner ends of said cages, rings applied detachably in said box and sustained by the shoulder nearest the ends of the box, antifriction means acting against the outer faces of said rings to position the box on the journal, a cap applied to the outer end of said box and covering the end of said journal, and means applied to said journal at the inner end of said box to exclude dust and water from the interior of said box.

In testimony whereof I have signed my name to this specification in the presence of two subscribing witnesses.

ROBERT D. CAMP.

Witnesses:
G. E. AMES,
H. C. REILLY.